United States Patent Office 3,187,835
Patented June 8, 1965

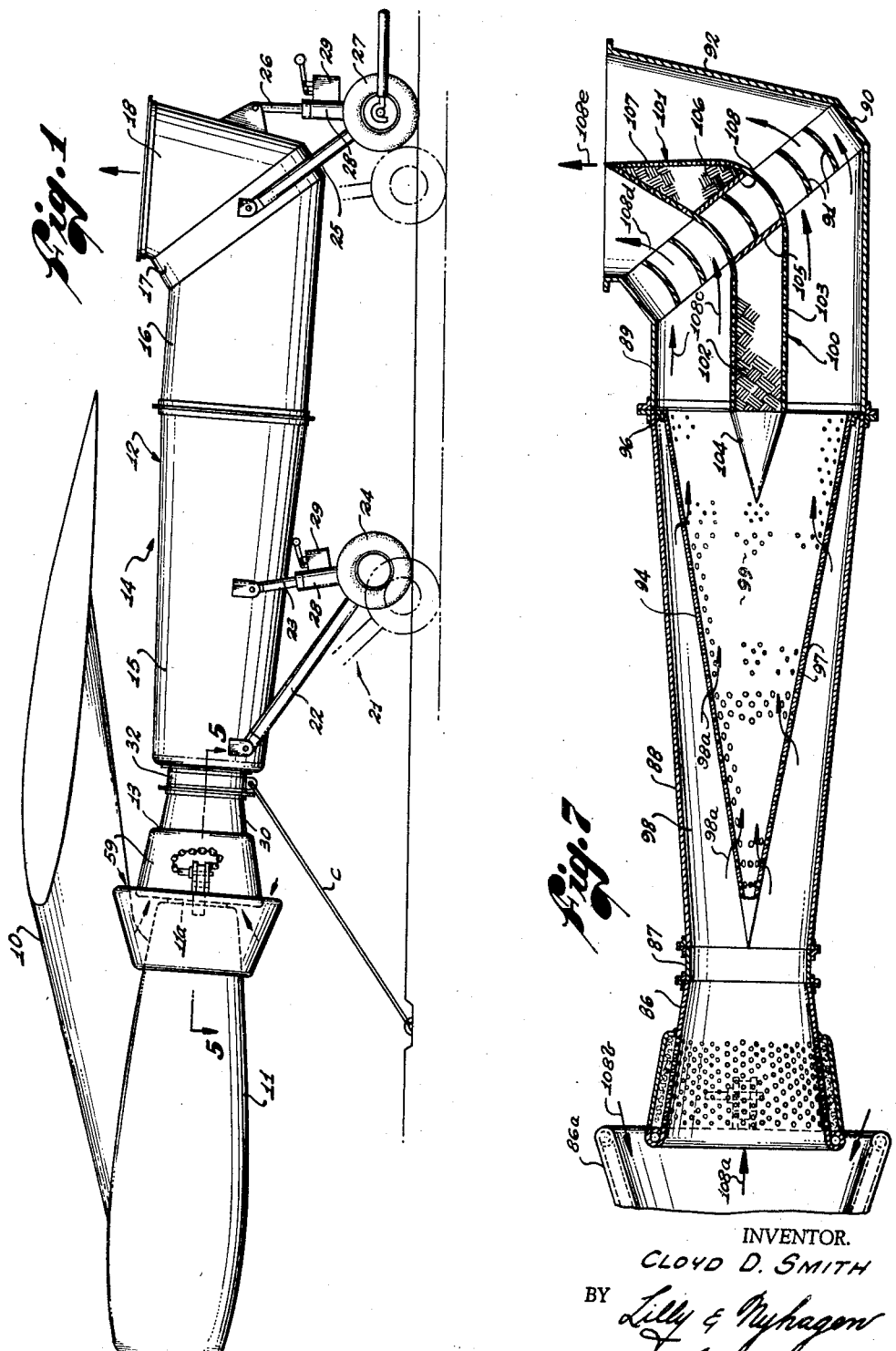

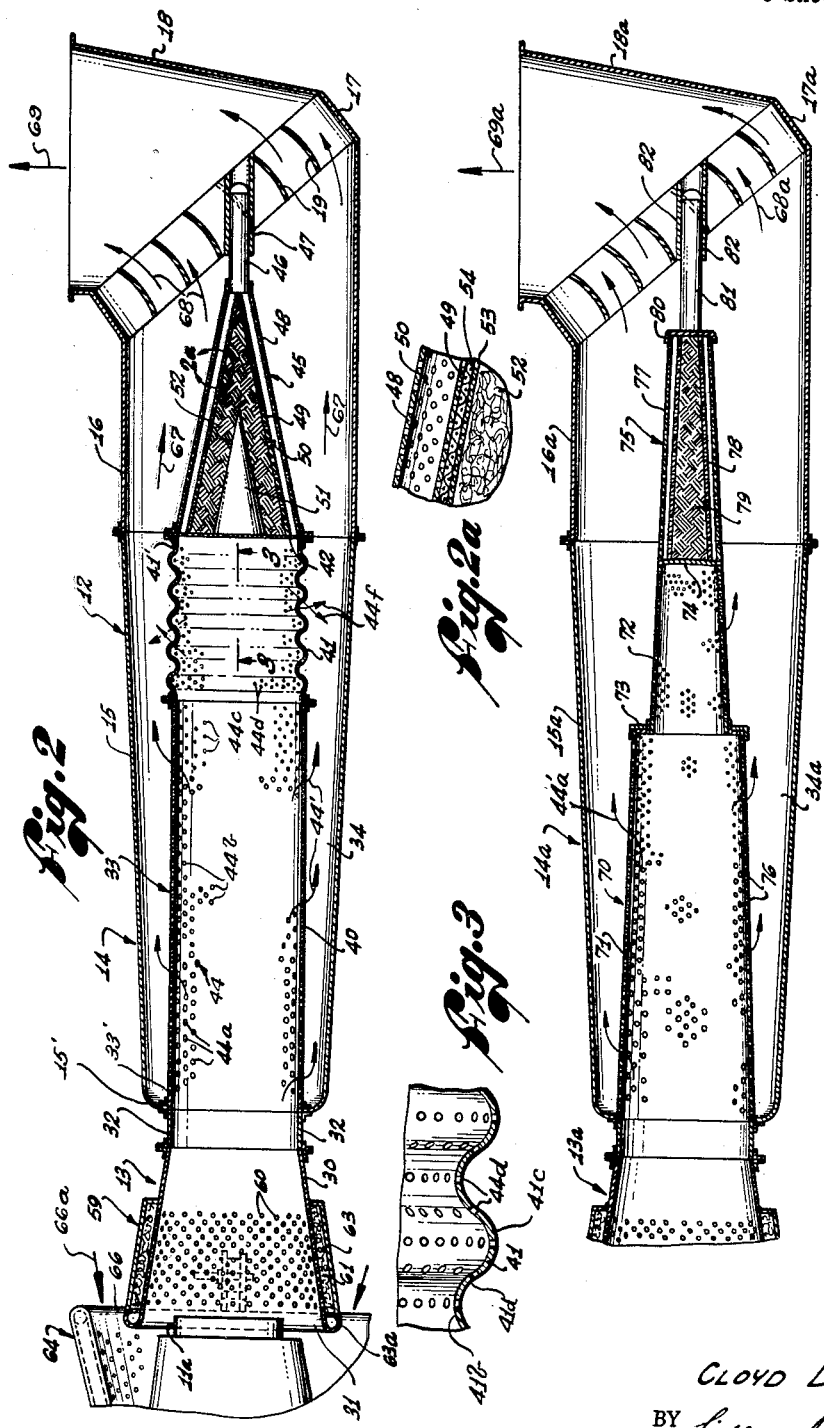

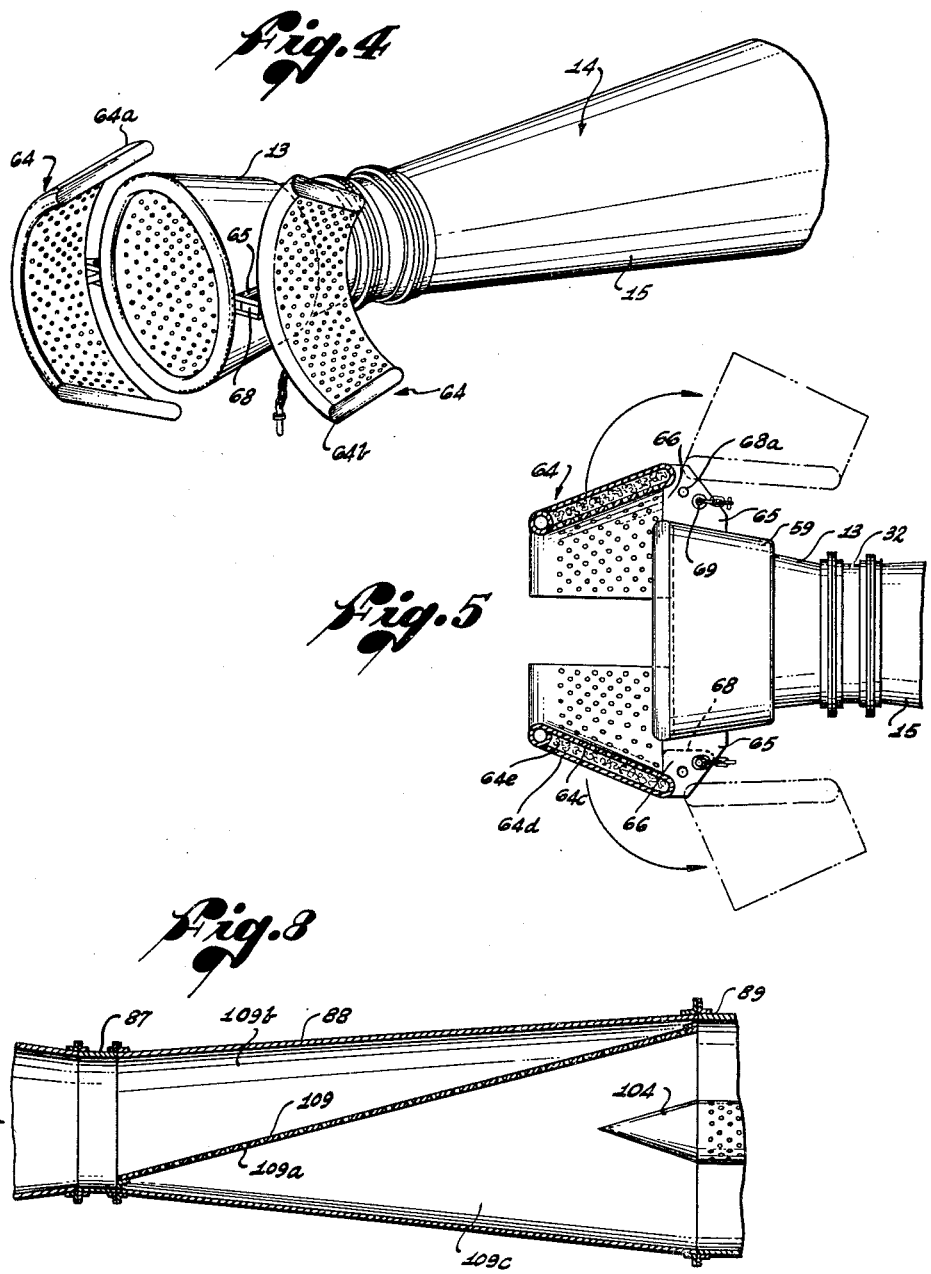

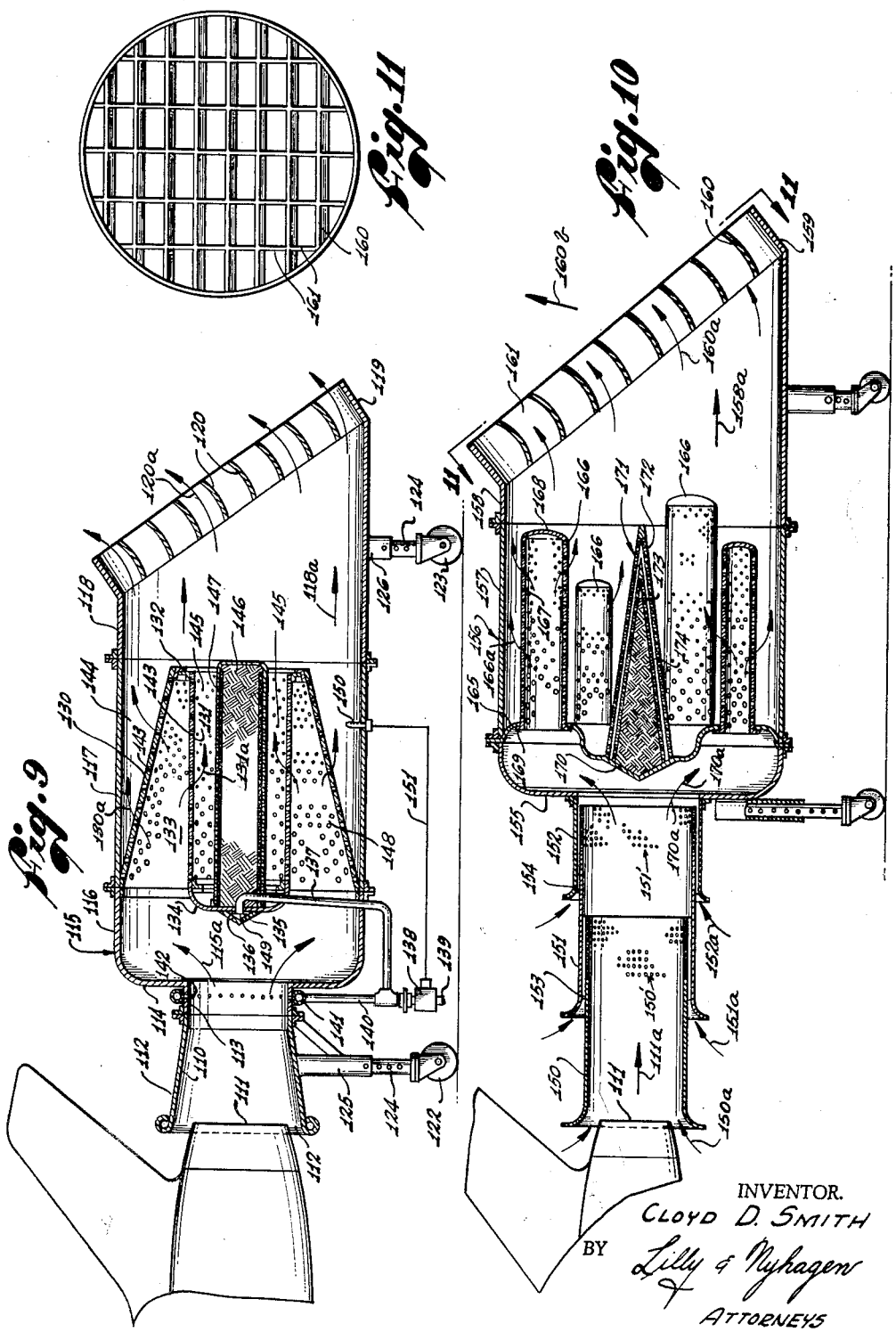

3,187,835
JET ENGINE NOISE SUPPRESSOR
Cloyd D. Smith, 14928 La Cumbre Drive,
Pacific Palisades, Calif.
Filed Feb. 8, 1960, Ser. No. 7,272
18 Claims. (Cl. 181—51)

This invention relates generally to exhaust noise suppressors for the engines of jet aircraft and, more particularly, to jet noise suppressors of the type used in connection with the engines of jet aircraft while the aircraft is on the ground.

The problems incident to the extremely high noise level produced by modern jet engines are well known. Not only is there created a nearly intolerable noise level in the neighborhood surrounding the landing field, but personnel having duties about the aircraft commonly suffer serious ear injury or loss of hearing. Landing field noise suppressors for jet engines are currently receiving considerable attention and have brought about some degree of improvement.

The general object of the present invention is the provision of improved noise suppressors of the class described, contributing effective solutions to a number of acoustic and aerodynamic problems involved in such suppressors, and characterized generally by large noise attenuation and exhaust gas velocity reduction, combined with simplicity, light weight, compactness, and portability.

The invention, speaking generally, provides novel, simple and effective combinations of augmentors, diffusers and sound absorbers, and improvement in these components. Certain terms used herein which have acquired a somewhat special meaning as used in the art may well be defined herein. An augmentor is a tubular inlet means adapted to partially receive the exhaust nozzle of a jet engine, and to do so with an annular clearance affording opportunity for aspiration of substantial secondary cooling air. A diffuser, in the ordinary parlance of fluid dynamics, is a divergent conduit wherein gas velocity is gradually decreased, and gas pressure correspondingly increased. The term diffuser, however, according to usage current in the jet noise suppressor art, as well as herein, commonly has the property of conduit divergence for velocity reduction and pressure increase, but includes, in addition, the concept of mixing secondary air with the gas stream or, in other words, diffusing the exhaust gases within or with respect to the admitted secondary air, and commonly utilizes a perforated wall through which the exhaust gases and secondary air are forced to flow, with resulting better mixing of the two. A diffuser, therefore, according to board usage in the present art, may in some cases not involve a divergent gas passage.

The diffusers of the invention are characterized by a number of novel features, including a progressive graduation of hole size in a perforated diffuser wall that extends generally longitudinally of the diffuser conduit. The effect of forcing the high velocity gas to flow through a small perforation is to convert sonic waves present in the gas stream to a series of higher frequencies, accompanied by conversion of a degree of sonic energy to heat, i.e., sound wave attenuation. By using different hole sizes, there results a wider band of resulting high frequency wave components, with reduced sound energy concentration at any given frequency, to obvious advantage. Aside from sonic wave attenuation and frequency conversion considerations, and from the standpoint of good aerodynamic flow characteristics, the use of graduated perforations, decreasing in size along the diffuser conduit, tends toward prevention of gas "stacking," i.e., pressure concentration, in the aft end of the diffuser conduit and, on the contrary, is conducive toward uniform flow through the conduit perforations from end to end of the perforated wall.

In accordance with a further feature of the invention, a sound absorber component is positioned axially in the exhaust stream leaving the diffuser, so as to be swept by the exhaust gas stream beyond the diffuser. This sound absorber acts acoustically to attenuate the relatively high frequency sound wave components present in the gas stream, including those produced by frequency shift within the diffuser.

From the aerodynamic standpoint, this sound absorber is preferably progressively reduced in cross-sectional area in the direction of gas flow, whereby to accomplish a corresponding progressive increase in cross-sectional area of the gas flow conduit. This has the desirable effect of causing the exhaust flow to gradually expand and slow down, without turbulence.

One further object of the invention is to provide improved aerodynamic characteristics through the suppressor as a whole, giving very material velocity reduction from intake to discharge, avoidance of large turbulence where such would materially reduce free gas flow through the suppressor, and contributing to the ability to handle large gas volume. It will be seen in this connection that conditions opposing free gas flow can result in refusal of the apparatus to accept the full gas flow from the jet engine, or the desired quantity of secondary air. The various components of the supressor of the invention, augmentor, diffuser and sound absorber, are combined in a manner to cooperate in the provision of good aerodynamic characteristics assuring the desired free flow, aspiration of secondary air, and large velocity reduction from intake to discharge.

The invention will be better understood from the following detailed description of a number of illustrative embodiments thereof, reference being had to the accompanying drawings, in which:

FIG. 1 is a side elevational view of a noise suppressor in accordance with the invention, shown in relation to the engine of a jet aircraft;

FIG. 2 is a longitudinal vertical medial section through the noise suppressor of FIG. 1, the front portion of a sound absorption collar being broken away;

FIG. 2a is an enlarged detail of the portion of the sound absorber unit of FIG. 2 enclosed within the dotted circle 2a;

FIG. 3 is an enlarged detail taken on section line 3—3 of FIG. 2;

FIG. 4 is a perspective view to an enlarged scale of the forward portion of the noise suppressor of FIG. 1, showing certain hinged sound absorber collar members;

FIG. 5 is an enlarged view partly in side elevation and partly in section taken in accordance with line 5—4 of FIG. 1;

FIG. 6 is a view similar to FIG. 2 but showing a modification;

FIG. 7 is a view similar to FIG. 2 but showing a modification;

FIG. 8 is a view similar to FIG. 2 but showing another modification;

FIG. 9 is a vertical longitudinal medial sectional view of another embodiment of the invention;

FIG. 10 is a view similar to FIG. 9 but showing a modification; and

FIG. 11 is a view to a reduced scale taken in accordance with line 11—11 of FIG. 10.

Reference is first directed to the embodiment of the invention shown in FIGS. 1–5. In FIG. 1, there is indicated an aircraft 10 equipped with a jet engine 11 having jet discharge nozzle 11a. The aircraft is on the ground, and an exhaust suppressor 12, in accordance with the invention, has been wheeled into position and adjusted as for both height and angle to align with jet nozzle 11a.

Suppressor 12 is in the form of a conduit system including an augmentor 13 in the form of a somewhat convergent gas inlet tube, and a tubular shell or gas conduit 14 comprising, in series, and in axial alignment, a divergent diffuser section 15, a sound absorber section 16, an angularly disposed baffle ring 17, and a relatively short, upturned gas exhaust outlet or stack 18. Ring 17 contains a plurality of baffle or deflector vanes 19 to turn the exhaust gas upwardly toward the stack.

A wheeled undercarriage 21 is provided, comprised in this instance of a pair of struts 22 and 23 pivotally mounted on each said of diffuser shell section 15 and converging to an axle (not shown) carrying wheels 24, and another pair of struts 25 and 26 on each side, pivotally mounted on member 17 and outlet 18, respectively, these struts also converging to an axle (not shown) for wheels 27. Struts 23 and 26 are adjustable in length, for adjustment of the height and angle of the suppressor to a particular aircraft, in the present instance by means of hydraulic jacks 28 incorporated therein and equipped with hand pumps 29.

Augmentor 13 comprises a preferably rearwardly convergent tube 30 whose forward end is adapted to receive the nozzle of the jet engine with annular clearance, as indicated at 31, to admit secondary air. This tube 30 is connected through a short neck 32 to the forward end 33' of an interior diffuser conduit 33 of like diameter, and the forward end 15' of diffuser shell section 15 is turned inwardly and connected to neck 32 and the forward end of diffuser conduit 33 at their juncture, as indicated. Thus there is afforded a rearwardly diverging annular diffuser passage 34 between the outside of interior diffuser conduit 33 and the exterior conduit means comprised of outer diffuser shell section 15. In the present illustrative embodiment, the diffuser conduit 33 comprises a straight cylinder 40 extending for approximately the first two-thirds of the length of the diffuser, followed by an annularly corrugated cylinder 41 extending for the remainder of the length of the diffuser. The rearward end of the diffuser conduit, specifically, in this instance, the rearward end 41' of corrugated cylinder 41, is closed by a heavy steel bulkhead 42.

The side walls of the diffuser conduit 33 are formed throughout with perforations 44 leading from the interior thereof into passageway 34. Preferably for reasons to be mentioned hereinafter, and as one major feature of the present suppressor, these perforations are graduated in size from large to small in the direction of gas flow. Thus, for example, the first and largest perforations 44a may be of the order of ¾ inch diameter; those perforation 44b in the mid region of cylinder 40 may be of the order of ½ inch diameter; and those perforation 44c in the aft region of cylinder 40, as well as those 44d throughout corrugated member 41, may be of the order of ¼ inch diameter. As shown best in FIG. 3, the perforations in the corrugated member are preferably punched in the bottoms 41b and tops 41c of the corrugations, and midway along the sides 41d thereof. The perforations and the gas flows therethrough are accordingly in various directions to one another, and they are angularly located and directed to define and produce, around the corrugated conduit, high velocity gas jets which impinge on one another so as to produce localized eddies and increased turbulence, with consequent energy dissipation, as well as better mixing with secondary air and improved cooling. These eddies, however, are localized and do not materially interfere with good free gas flow in the passage 34 therearound. The perforations will be seen to be in the nature of unobstructed, straight-through, high-velocity gas-jet orifices, which produce high velocity gas jets of graduated sizes capable to attenuating the jet noise throughout a wide frequency range.

Mounted on and extending beyond diffuser bulkhead 42, within the conduit means afforder by shell section 16, is a sound absorber cone assembly or body 45. This assembly 45 extends axially substantially through absorber shell section 16, and terminates in a support plunger 46 slidably received in a guide or barrel 47 mounted through and on the deflector vanes 19, as clearly shown in FIG. 2. In the specific embodiment of FIG. 2, the cone assembly 45 comprises an outer perforated sheet steel cone 48, a second perforated sheet steel cone 49 spaced just inside cone 48, with an air space 50 therebetween, and an inside solid steel cone 51 spaced inside cone 49. Cones 48, 49 and 51 are welded to bulkhead 42. A thick conical layer 52 of heat resistant sound absorption material, preferably a fibrous substance, such as glass fiber, is placed between cones 49 and 51. Preferably, as shown in the enlarged detail view of FIG. 2a, a layer of glass cloth 53 is placed around fibrous cone 52, and between this layer 53 and sheet metal cone 49 is a layer of screen 54, preferably of corrugated wire mesh.

As a perferred but optional feature, a sound absorber 59 is used around the augmentor. Thus, the augmentor tube 30 is perforated, as indicated at 60, and surrounded by a layer 61 of heat resistance fibrous sound absorbing material, such as glass fiber, and this layer 61 is enclosed by a jacket 63 welded at one end to the side of tube 30 and at the other to a rolled-out flange 63a on the inlet end of the augmentor tube.

Preferably, the augmentor 13 is equipped with a forwardly projecting split, frusto-conical sound absorber collar 64, made in two sections 64a and 64b which are hinged to opposite sides of the augmentor on vertical hinge lines through bracket plates 65 (see particularly FIGS. 4 and 5). The forward or nose ends of the collar sections 64a and 64b are engageable with the jet engine housing and fit closely therewith, while the aft ends of the collar sections terminate just rearwardly of the forward end of the augmentor, and are annularly spaced outside the same to provide an annular space 66 for intake of secondary air (arrow 66a). The collar sections may be spaced at the top to receive the pylon (not shown) of the jet aircraft. The hinge connections permit these sections to be swung out during initial positioning of the suppressor, as indicated in FIGS. 4 and 5. Each collar section comprises a perforated inner wall 64c, and an imperforate outer wall 64d spaced outside thereof, with sound absorption material 64e packed therebetween. The hinge mountings of the collar sections, as here shown, comprise the spaced bracket plates 65 welded to the outside of the augmentor, and hinge plates 68 received therebetween and secured to the collar sections, pivot pins 68a furnishing the hinge connection. Means are provided for locking the collar sections in closed position, comprising in this instance locking pins 69 adapted for reception in aligned openings in the bracket plates 65 and hinge plates 68. These collar sections absorb noise otherwise radiating from the front end of the suppressor.

The suppressor may be anchored to the ground by means of a tie-down cable C which is secured to a clamp collar 32a surrounding the neck 32 of augmentor 13.

In use, the noise suppressor is wheeled into position to the rear of the jet engine whose noise is to be suppressed and adjusted in both height and angle to the jet exhaust nozzle 11a, being positioned so that the latter is received somewhat inside the forward or inlet end of augmentor tube 30 (see FIG. 1). The collar sections are moved to and locked in closed position.

The exhaust gases are typically received from nozzle 11a at a temperature ranging upwards from 1,100° F., and at a velocity of around 1,100 feet per second. These high velocity gases traveling through the augmentor tube develop an aspirating or injection action causing in-flow, through the annular space 31 around the gas stream and the annular space 66 inside the large end of collar 64, of a substantial quantity of secondary air, which mixes with and cools the air stream, and acts to reduce its velocity. The sound absorbing fibrous material 61 outside the augmentor tube, and communicating therewith through the perforations 60, serves to absorb a significant proportion of the noise of the jet stream, as does the sound absorption material 64e of collar 64.

From the augmentor, the jet stream passes into and along the longitudinal passage afforded by diffuser conduit 33. The gases pass laterally outward through the side walls of diffuser conduit 33 through the perforations 44 therein to the annular gas passage 34 between said conduit 33 and diffuser shell section 15 (arrows 44′ in FIG. 2). The high velocity jet stream would tend ordinarily to stack up at the aft end of conduit 33. The graduated perforations 44 combat this tendency, and tend to produce uniform flow through the perforations from end to end of the conduit 33. An alternative within the scope of the invention is to provide perforations of uniform size, but to decrease the spacing, and, therefore, the number, of perforations in the downstream direction along the conduit. Basically, therefore, the invention provides gradually decreased perforation area in the downstream direction. Of course, both the size and the number of perforations may be decreased.

The perforations 44 also function to raise the frequency of the noise present from objectional lower frequencies to less objectional higher frequencies, and this frequency conversion is accompanied by dissipation of a certain amount of sound energy in the form of heat. The holes thus not only convert frequency, but attenuate the sound waves. By providing holes of graduated sizes, broader frequency band coverage is afforded. In this connection, each frequency initially present is attenuated to a maximum extent by a hole of given size, so that a plurality of hole sizes results in good attenuation of a wider frequency band. Also, the high frequencies produced are governed by hole size, so that a plurality of hole sizes results in a wider band of high frequencies, with better frequency distribution of sound energy.

The corrugated section 41 of diffuser conduit 33 is especially advantageous. The multi-directional individual gas jets through the perforations therein impinge on one another as represented by arrows 44f, causing local turbulence and better mixing of the exhaust gases with the secondary air, as well as added energy dissipation. In addition, the corrugated physical form of the conduit in this region affords better stiffness and durability in the region of maximum heat and high velocity thereadjacent.

It will be seen that the area of the annular gas passage 34 at the aft end of the diffuser section is materially greater than that of conduit 33 at its point of communication with augmentor 13. A considerable reduction in gas velocity, and corresponding increase in pressure (diffusion), is therefore accomplished in the diffuser between the point of intake thereto and the point of discharge therefrom into sound absorber section 16.

The converging axial sound absorbing cone 45 within sound absorber section 16 accomplishes a still further material increase in cross-sectional area of flow passage, with correspondingly further decrease in gas velocity and increase in pressure, and the gradual transition is conducive to avoidance of turbulence in this region.

Moreover, in passing over the sound absorber cone, the higher sound frequencies remaining in the gas stream are materially attenuated by the cone.

The exhaust gas sweeping past the cone, at very greatly decreased velocity and sound energy content, as represented by arrows 67, is turned upwardly by vanes 19 (arrows 68), and exhausted from the stack, as indicated by arrow 69. The exhaust gases are found to be reduced to a velocity of from 300 to 400 feet per second and a temperature of 500 to 600° F. (assuming incoming conditions as stated hereinabove). The reduction in temperature of the exhaust gases is due partly to the cooling effect of the secondary air drawn into the augmentor, and partly to heat flow into the walls of the suppressor, and radiation from the exterior wall surfaces thereof. It will be evident that the reduction in temperature of the gases flowing through the suppressor reduces the volume thereof, and therefore contributes to a material reduction in both gas pressure and velocity.

The plunger and sleeve arrangement at the end of the sound absorber cone assembly 45 accommodates thermal longitudinal expansion and contraction of the conduit 33. As shown, the extremities of cones 48 and 49 are welded to plunger 46, and the latter is slidably received in sleeve 47. It will be seen that this arrangement, in addition to accommodating expansion and contraction, furnishes a simple, easily assembled and disassembled mounting for one end of the conduit 33 and for the sound absorber cone assembly.

FIG. 6 shows a modified form of the invention, utilizing, however, an augmentor, exterior shell, discharge outlet, and various auxiliary features identical to those of the embodiment of FIGS. 1–5. These parts will therefore not require description in connection with FIG. 6, but for convenience are designated by similar reference numerals but with the suffix "a" annexed in the case of FIG. 6. The modifications in FIG. 6 are thus confined to the diffuser and sound absorber components, which will now be described.

The perforated diffuser conduit, designated generally in this instance by numeral 70, comprises, first, a somewhat convergent perforated tubular member 71, joined to the augmentor and to the exterior shell in the manner of FIGS. 1–5, and, second, the forward portion of a convergent tubular member 72 of reduced diameter, flange-connected to member 71 as indicated at 73. Welded across member 72, in the region of its mid portion, is a bulkhead 74, and aft of the latter is a sound absorber generally designated by numeral 75. Conduit members 71 and 72 are formed with graduated perforations, such as 76, in the manner of the embodiment of FIGS. 1–5.

Beyond bulkhead 74, tubular member 72 is also perforated, as indicated at 77. Annularly spaced inside tubular member 72, aft of bulkhead 74, is a conical perforated wall 78, enclosing a body 79 of fibrous sound absorption material, such as glass fiber. The sound absorber assembly is terminated by means of a plate 80 welded to the ends of members 72 and 78, and beyond plate 80, and welded thereto is plunger 81 slidably received in a sleeve 82 as in the embodiment of FIGS. 1–5.

The embodiment of FIG. 6 possesses the same general features and advantages of that of FIGS. 1–5, with the exception of the corrugated diffuser section, and differs from the embodiment of FIGS. 1–5 in providing for somewhat greater expansion in the area of the gas flow path 34a within the diffuser section, with corresponding earlier and greater reduction in gas flow velocity.

FIG. 7 shows another embodiment of the invention. In this case, an augmentor 86, augmentor neck 87, and collar 86a are utilized as in the embodiment of FIGS. 1–5. The exterior shell beyond neck 87 comprises a divergent tubular member 88, flange-connected to neck 87, as shown, and a sound absorber section 89 beyond member 88, generally similar to but here shown to be shorter than that of FIGS. 1–5. The sound absorber section 89 terminates in ring 90 containing deflecting vanes 91, and short stack or outlet 92.

Within diffuser shell section 88 is a perforated divergent cone 94 of sheet steel, with its apex approximately in the plane of the beginning end of the diffuser section, and with its large end flange-connected to the aft end of diffuser shell section 88, as indicated at 96. Cone 94 is provided throughout its area with a multiplicity of perforations 97, of graduated size as explained in connection with FIGS. 1–5. Thus there is afforded an annular gas passage 98 between diffuser cone 94 and wall 88, in open communication with augmentor 86, and in lateral communication, via perforations 97, with the laterally overlapping gas passage 99 defined by cone 94 (see gas flow arrows 98a). Again, substantial increase in gas passage area, with corresponding velocity reduction, is provided between the beginning end of the diffuser section and the point of entry into the sound absorber section.

The sound absorber comprises, in this instance, two axially positioned components 100 and 101. Component 100 is in the form of a generally cylindrical body of fibrous heat resistant and sound absorbent material 102 mounted coaxially in absorber shell section 89 inside a perforated sheet steel cylinder 103 which is mounted on the metal vanes 91, and is tipped by a forwardly facing solid steel cone 104 extending into the aft end portion of diffuser cone 94. As shown, the cylinder 103 is closed adjacent vanes 91 by means of a plate 105.

The sound absorber component 101 comprises a conical body 106 of fibrous sound absorption material, enclosed by a perforated cone 107 of sheet steel directed axially upward of outlet stack 92, and mounted on the central vanes 91 in general alignment, insofar as gas flow path through the apparatus is concerned, with the sound absorber component 100. The large end of cone 107, adjacent vanes 91, is closed by means of a steel plate 108.

The embodiment of FIG. 7 will be seen to have functions and performances analogous, in general, to those of the earlier described embodiments. Here, however, the jet gases (arrow 108a) and secondary air (arrow 108b) received from augmentor 86, instead of passing first into the end of a perforated conduit, are first received in the annular passageway 98 defined by diffuser shell section 88. Then, instead of passing outwardly through perforated walls of an inner diffuser conduit, the gases pass laterally inward through the walls of a perforated diffuser conduit (arrows 98a), sweeping thence over the sound absorber components 100 and 101 (arrows 108c and 108d, respectively) on their way to final discharge (arrow 108e). The functions of the diffuser, the perforated wall thereof, and the absorber components are substantially as previously described in connection with the embodiment of FIGS. 1–5. The cone 104 splits the gas stream without material turbulence, and the conical absorber body 106 permits expansion of the gases without turbulence.

In FIG. 8 is shown fragmentarily a modification of FIG. 7, reference numerals being the same excepting for differing structure in FIG. 8. In this case, the perforated diffuser cone of FIG. 7 is replaced by a diagonal wall 109 having perforations 109a. While the perforations may be of progressively diminishing size in the direction of gas flow, as specifically shown in earlier embodiments, I here illustrate the case in which the number of perforations per unit area is decreased, giving uniform gas flow in the diffuser, though not the frequency dispersion resulting from graduated hole sizes. The wall 109 will be further understod to extend from side to side of the diffuser wall 88, so as to provide an inlet passage 109b of progressively diminishing cross section in communication with the augmentor, and a discharge passage 109c of progressively expanding cross section leading to the sound absorber section and exhaust outlet. The passages 109b and 109c are in lateral communication all along the length of wall 109 via perforations 109a. Gas flow through the diffuser section is uniform by the progressive diminution of perforation area, in a manner analogous to that earlier described.

FIG. 9 shows another embodiment of the invention, having features in common with the embodiments earlier described, but departing in the concepts of adaptability for reception of gases at still higher exhaust temperatures and velocities, such as are encountered with jet aircraft engines equipped with afterburners, which exhaust temperatures may be in the neighborhood of 3,400° F., with exhaust gas velocities of the order of 2,500 feet per second. The objective again is the reduction of temperature to the order of 500° F., and discharge velocities to 300 to 400 feet per second.

In FIG. 9, an augmentor tube 110 is adapted to receive, with annular clearance, the jet discharge nozzle indicated generally by the numeral 111, affording an annular passageway 112 for aspiration of secondary air. Augmentor tube 110, which may, if desired, be furnished with an encircling sound absorber unit of the type like that designated at 59 in FIGS. 1–5, and also with a sound absorber collar like that designated at 64 in FIGS. 1–5, is convergent to a short neck portion 113, which, in turn, opens through the end wall 114 of an enlarged diameter shell generally designated by numeral 115. The latter includes a water cooling section 116, a diffuser and sound absorber section 117, and an outlet section 118 equipped at its extremity with a ring member 119 containing turning vanes 120 adapted to discharge the exhaust gases in a generally upward direction.

The suppressor is furnished with caster-type wheels 122 and 123, which are on shafts 124 adjustably receivable in tubes 125 and 126 welded to and extending downwardly from augmentor 112 and outlet shell section 118, respectively.

The diffuser includes a frusto-conical rearwardly convergent wall 130 engaging at its forward extremity and secured, as by bolting, within the rearward end of shell section 116, the wall projecting substantially the full length of diffuser shell section 117, all as clearly shown in FIG. 9. Coaxially mounted inside this wall 130 is a cylinder 131, the rearward extremity of which is flange-mounted on the rearward extremity of wall 130, as indicated at 132, so as to provide an annular, longitudinally extending and convergent gas passage 133 therebetween. Connected to the forward extremity of cylinder 131 is a domed closure 134, and mounted on the latter in a position on the central longitudinal axis of the apparatus is a hollow cone 135 that faces directly toward the core of the jet stream entering via the augmentor. This hollow cone 135 has a plurality of cooling water discharge orifices 136, and it is fed with water through a branch pipe 137 leading through an automatic control valve 138 from a water supply pipe 139. Another branch pipe 140, also fed through valve 138, supplies a hollow ring 141 encircling augmentor neck 113 and communicating with the interior of the latter via water discharge orifices 142.

Frusto-conical diffuser wall 130 and cylindrical diffuser wall 131 are furnished throughout with gas passing perforations 143, again of graduated sizes or area as disclosed in connection with FIGS. 1–5. Exhaust gases passing through the perforations in frusto-conical wall 130 (arrows 130a) enter and traverse a divergent diffusion passage 144 between wall 130 and shell section 117, while gases passing through the perforations 143 in cylindrical wall 131 (arrows 131a) flow through an annular passage 145 between wall 131 and a sound absorber body 146 of cylindrical form mounted inside and spaced annularly within the wall 131. The sound absorber body 146 is again of fibrous, highly heat resistant sound absorbing material, such as glass fiber, and in this instance is in the form of a cylinder, encased in a perforated steel cylindrical container 147 mounted on and projecting rearwardly from the aforementioned domed closure 134. Between fibrous body 146 and perforated enclosure wall 147 may be a layer of glass cloth and a layer of wire mesh, as explained in connection with the sound absorber body of FIGS. 1–5. Thus, the gas passing through the perforations 143 in wall 131 traverses the passage 145 and is subjected to the sound absorbing properties of the body 146. As in earlier described embodiments of the invention, the function of the sound absorber body 146 is again the removal of the relatively higher noise frequencies.

Water introduction into augmentor neck 113 via orifices 142, and into the water cooling space or chamber 149 via the orifices 136 in cone 135, is preferably under the automatic control of a conventional temperature sensing element 150 mounted inside shell 117, on the rearward portion of the latter, which sensing element, through a control circuit diagrammatically indicated at 151, automatically acts to open control valve 138 whenever the exhaust gas temperature exceeds a predetermined level. Sensing elements and electrically controlled valves suitable for the purpose are well known in the art and examples thereof need not be given herein.

Operation of the suppressor of FIG. 9 may be described as follows: The exhaust jet stream from the nozzle 111 of the jet engine is received within and passes through augmentor 112, along with a substantial flow of secondary air injected into the augmentor around the nozzle by reason of the aspiration effect of the jet stream. The jet stream and secondary air pass through augmentor neck 113, wherein water is sprayed inwardly to partially cool the gases. The jet stream is directed axially against cone 135 and closure head 134, and is split and directed outwardly thereby as indicated by the arrows 115a. The central core of the jet stream is at the highest temperature, and the water spray orifices 136 in cone 135 impinge on this most highly heated core of gases, further very materially reducing the temperature. The gases then flow into the diffuser portion of the apparatus, longitudinally inward into the passage space between perforated walls 130 and 131. From this passage space, the gases travel both outwardly through the perforations in wall 130 to the annular passage 144, and inwardly through the perforations in wall 131 to the annular passage 145. The perforations in walls 130 and 131 are graduated, as indicated, to counteract a tendency for stacking toward the end region of the space between walls 130 and 131. Thus, as explained in more detail in connection with the embodiment of FIGS. 1–5, the flow through the perforations in walls 130 and 131 tends toward uniformity from end to end of the walls. In passing through the perforations in walls 130 and 131, the exhaust gases are further mixed with the secondary air, a degree of sonic energy is dissipated to heat, and sound frequencies in the lower ranges are converted to a band of less objectionable high frequencies. The gas stream that passes through the perforations in wall 131 then sweeps over the sound absorber 146, where high frequency components, including high frequencies created in passing through the perforations in wall 131, are materially attenuated. The exhaust gases (arrows 118a) combine within outlet shell 118, and are deflected upwardly by the vanes 120 as at 120a.

A still further embodiment of the invention is shown in FIGS. 10 and 11. The suppressor in this case is again of the compact type, such as that of FIG. 9, but utilizes a modified augmentor tube means, and, as shown, omits the water spray feature of the embodiment of FIG. 9. In addition, certain modifications are presented in the diffuser and absorber components.

The augmentor tube means comprises in this instance a series of three annularly spaced tubes 150, 151 and 152, one within the other, as shown. The first tube 150 receives the jet nozzle 111 of the jet engine with annular clearance, so as to receive jet gases (arrow 111a) and to accomplish aspiration of secondary air (arrow 150a), as in earlier embodiments. The second tube 151 as annularly spaced outside first tube 150, so as to accomplish additional aspiration of secondary air between tubes 150 and 151 (arrows 151a). Similarly, the third tube 152 is annularly spaced outside second tube 151, also for additional aspiration of secondary air (arrows 152a).

Tube 150 may be mounted to tube 151 as by means of radial webs 153, and tube 151 may, in turn, be mounted to tube 152 by means of radial webs 154. Additionally, the inner extremities of tubes 150 and 151 are shown to be perforated throughout a fairly wide band, as at 150' and 151', respectively. Secondary air drawn inwardly through these perforations accomplishes a degree of turbulence and earlier and more complete mixing with the exhaust gas stream. Tube 152 is joined to and opens inside the front wall 155 of the front section of an exterior gas-conduit-defining shell, generally designated by numeral 156. The wall 155 will be seen to form an enlargement of the gas conduit, just aft of the augmentor tubes. The shell 156 comprises, in addition to member 155, a tubular diffuser and sound absorber section 157, and an outlet section 158, resembling in all respects that of FIG. 9. Thus, as shown, shell section 158 terminates in ring 159 provided with turning vanes 160. FIG. 11 shows the vanes 160 to be spaced by integral vertical walls 161 for increased strength and rigidity, and it will be understood that this grid-like structure may be used in any of the embodiments of the invention heretofore described.

A wall in the form of an annulus 165 is mounted across the interior of shell 156, substantially in the plane of the forward end of shell section 157. This wall or annulus 165 is provided with a plurality of circumferentially spaced openings to receive a corresponding plurality of diffuser cylinders 166. Each diffuser cylinder 166 comprises a cylindrical side wall formed throughout its length with graduated perforations 167, as shown, an aft end closure 168, and a supporting flange 169 at its forward end in engagement with the wall of annulus 165. The diffuser cylinders 166 are of different lengths and diameters for the purpose of different attenuative frequency response to different sound frequencies, whereby to furnish good or improved frequency band width coverage.

The central portion of annulus 165 is formed into a forwardly facing cone 170, designed to deflect the oncoming gas stream radially outward in all directions (arrows 170a). On the opposite side of the central portion of annulus 165 is a conical sound absorber assembly generally designated by the numeral 171. This assembly may comprise an outer sheet metal cone 172, a second sheet metal cone 173 spaced inside cone 172, and a body of fibrous, heat resistant sound absorption material 174, such as glass fiber, packed inside cone 173. The conical form of the sound absorber again affords the property of gas expansion without turbulence.

The multi-tube augmentor of FIG. 10 has the advantage of increased aspiration of secondary air, and earlier mixing thereof with the exhaust jet stream. It also has the feature that the sound wave attenuation properties of the perforated cylinders 166 are, by reason of variance in length and diameter, made more selectively responsive to particular frequencies of the sound spectrum, giving improved band width coverage. Otherwise, its features are similar or analogous to the embodiment of FIG. 9. Thus, the spreading gases 170a enter diffuser cylinders 166, pass through the perforations therein, as indicated at 166a, and a portion of these gases sweep over sound absorber cone 171. These gases then pass through outlet shell section 158, as indicated at 158a, are turned upwardly by vanes 160 (arrows 160a), and discharge vertically as indicated at 160b.

I have now shown and described a number of illustrative embodiments of the invention, but it will be understood that they are for illustrative purposes only, and that various changes in design, structure and arrangement may be made without departing from the spirit and scope of the invention or of the broader of the appended claims.

What is claimed is:

1. In a suppressor for exhaust noise of a jet engine, the combination of: an augmentor tube means having an inlet end adapted to receive the exhaust gas stream from a jet engine and an injection flow of secondary ambient air around said stream, a tubular shell having an anterior end coupled to and extending axially beyond the opposite end of said augmentor tube means, wall means within and extending generally longitudinally of said tubular shell and joined at one end to said shell, so as to form two gas passages extending longitudinally of the shell, one on each side of said wall means, with one of said gas passages in communication with said augmentor tube means, and the other leading to the aft end of the shell, said wall means having a multiplicity of unobstructed, high velocity gas-jet orifices formed therein adapted to pass gas received into one of said passages from said augmentor tube to the other of said passages, said perforations being of progressively decreasing size in the direction of gas flow along said wall means, and said shell having a gas outlet at the aft end thereof.

2. In a suppressor for exhaust noise of a jet engine, the combination of: a gas conduit system comprising an augmentor tube means having an inlet end adapted to receive the exhaust gas stream from a jet engine and an injection flow of secondary ambient air around said stream, an exterior gas conduit means coupled to and extending axially beyond the opposite end of said augmentor tube means, an interior gas conduit means inside said exterior conduit means, one of said conduit means being arranged to receive gas directly from said augmentor tube means, said interior conduit means including a longitudinal wall provided therealong with a multiplicity of unobstructed, high velocity gas-jet orifices through which gas passes from one to the other of said conduit means, the last-mentioned conduit means terminating in a gas outlet, and said orifices being of progressively smaller size in the direction of gas flow along said longitudinal wall.

3. In a suppressor for exhaust noise of a jet engine, the combination of: an augmentor tube means having an inlet end adapted to receive the exhaust gas stream from a jet engine and an injection flow of secondary ambient air around said stream, an interior gas conduit connected to and extending axially beyond the opposite end of said augmentor tube means, said interior gas conduit including a wall section having corrugations therein, a closure for the aft end of said conduit, an exterior conduit annularly spaced outside said first-mentioned conduit and connected to the anterior end thereof, whereby to form an annular gas passage therearound, said inner conduit provided with a multiplicity of gas passing perforations therealong, whereby to afford communication between it and said annular gas passage, a sound absorber body mounted axially within said exterior conduit beyond said inner conduit, and gas outlet means at the aft end of said exterior conduit beyond said sound absorber body.

4. The subject matter of claim 3, wherein some of said perforations are in said wall section having said corrugations, and are located in said corrugations so as to be angularly related and directed to define and produce points of impingement of gas jets issuing therethrough.

5. In a suppressor for exhaust noise of a jet engine, the combination of: an augmentor tube means having an inlet end adapted to receive the exhaust gas stream from a jet engine and an injection flow of secondary ambient air around said stream, an interior gas conduit connected to and extending axially beyond the opposite end of said augmentor tube means, a closure for the aft end of said conduit, an exterior conduit annularly spaced outside said first-mentioned conduit and connected to the anterior end thereof, whereby to form an annular gas passage therearound, said inner conduit provided therealong with a multiplicity of unobstructed, high velocity gas-jet orifices, whereby to afford communication between it and said annular gas passage, said orifices being of progressively smaller size in the direction of gas flow through said conduits, and gas outlet means at the aft end of said exterior conduit beyond said sound absorber body.

6. An augmentor forming the inlet conduit of a noise suppressor for a jet engine housed in an engine nacelle, comprising: an augmentor tube adapted to be positioned with its inlet end opposite the discharge outlet of the jet engine, and a pair of frusto-conical sound absorber collar sections pivotally mounted on said augmentor tube or opposite sides thereof and projecting forwardly therefrom, said collar sections being pivotally movable between outwardly swung positions clearing the nacelle during positioning of the noise suppressor and inwardly swung positions with the forward ends thereof immediately adjacent the nacelle of the jet engine, said frusto-conical collar sections being divergent rearwardly of the augmentor tube and the rearward end portions of said collar sections surrounding but being annularly spaced from the inlet end of the augmentor tube for admission of ambient secondary air thereto.

7. In a suppressor for exhaust noise of a jet engine, the combination of: an augmentor tube means having an inlet end adapted to receive the exhaust gas stream from a jet engine and an injection flow of secondary ambient air around said stream, a gas conduit connected at one end to and extending axially from the opposite end of said augmentor tube means, said conduit being terminated at its opposite end by a discharge outlet, interior wall means arranged generally longitudinally in said conduit dividing the interior thereof into two laterally overlapping longitudinal gas flow passageways, one of which has an upstream end which communicates directly with and receives gas flow from said augmentor tube means, and the other of which has a downstream end which communicates directly with and delivers gas to said discharge outlet, there being a multiplicity of unobstructed high velocity gas-jet orifices formed in and along the length of said wall means to provide gas flow between said passageways along the length thereof, said orifices being of progressively decreasing size in the direction of gas flow along the conduit.

8. In a suppressor for exhaust noise of a jet engine, the combination of: an augmentor tube means having an inlet end adapted to receive the exhaust gas stream from a jet engine and in injection flow of secondary ambient air around said stream, an exterior gas conduit of larger diameter than said augmentor tube means having a reduction at its anterior end joined to said augmentor tube means, said gas conduit extending axially of and from said tube means, a discharge outlet terminating said conduit, a wall across said gas conduit spaced axially from said tube means, and a plurality of interior gas diffuser conduits having a multiplicity of gas flow perforations therealong, said diffuser conduits opening forwardly in said exterior conduit through said wall and extending rearwardly in said exterior conduit from said header, and closures for the rearward ends of said diffuser conduits.

9. The subject matter of claim 8, wherein said diffuser conduits are of different lengths.

10. The subject matter of claim 8, wherein said diffuser conduits are of different diameters.

11. The subject matter of claim 8, including also a sound absorber body mounted axially on the rearward side of said wall and projecting longitudinally and rearwardly therefrom at lateral spacing from said perforated gas diffuser conduits.

12. The subject matter of claim 11, wherein said sound absorber body is rearwardly convergent to effect gas expansion without material turbulence.

13. In a suppressor for exhaust noise of a jet engine, the combination of: an augmentor tube means having an inlet end adapted to receive the exhaust gas stream from a jet engine and an injection flow of secondary ambient air around said stream, an interior gas conduit connected to and extending axially beyond the opposite end of said augmentor tube means, an annularly corrugated aft section included in said interior gas conduit, a closure for the aft end of said conduit, an exterior conduit annularly spaced outside said first-mentioned conduit and connected to the anterior end thereof, whereby to form an annular gas passage thereabout, said inner conduit provided with a multiplicity of gas-passing perforations therealong, whereby to afford communication between it and said annular gas passage, a sound absorber body mounted axially within said exterior conduit beyond said inner conduit, and gas outlet means at the aft end of said exterior conduit beyond said sound absorber body.

14. In a suppressor for exhaust noise of a jet engine, the combination of: an augmentor tube means having an inlet end adapted to receive the exhaust gas stream from a jet engine and an injection flow of secondary ambient air around said stream, an interior gas conduit connected to and extending axially beyond the opposite end of said augmentor tube means, a closure for the aft end of said conduit, an exterior conduit annularly spaced outside said first-mentioned condit and connected to the anterior end thereof, whereby to form an annular gas passage therearound, said inner conduit provided with a multiplicity of gas-passing perforations therealong, whereby to afford communication between it and said annular gas passage, a sound absorber body mounted axially within said exterior conduit beyond said inner conduit on said closure therefor, a plunger projecting axially in a rearward direction from said sound absorber body, a supporting guide for said plunger mounted on said exterior conduit, said supporting guide receiving said plunger for axial movement to accommodate longitudinal thermal expansion and contraction of said inner conduit, and gas outlet means at the aft end of said exterior conduit beyond said sound absorber body.

15. An augmentor forming the inlet conduit of a noise suppressor for a jet engine housed in an engine nacelle, comprising: an augmentor tube adapted to be positioned with its inlet end opposite the discharge outlet of the jet engine, and a plurality of frusto-conical collar sections pivotally mounted on said augmentor tube at spaced positions therearound and projecting forwardly therefrom, said collar sections being pivotally movable between outwardly swung positions clearing the nacelle during positioning of the noise suppressor and inwardly swung positions with the forward ends thereof immediately adjacent the nacelle of the jet engine, said frusto-conical collar sections being divergent rearwardly of the augentor tube and the rearward end portions of said collar sections surrounding but being annularly spaced from the inlet end of the augmentor tube for admission of ambient secondary air thereto.

16. In a suppressor for exhaust noise of a jet engine, the combination of: an augmentor tube means having an inlet end adapted to receive the exhaust gas stream from a jet engine and an injection flow of secondary ambient air around said stream, a gas conduit connected at one end to and extending axially from the opposite end of said augmentor tube means, said conduit being terminated at its opposite end by a discharge outlet, a conical wall in said conduit with its apex directed upstream therein and whose base is joined to said conduit, said conical wall dividing the interior thereof into two laterally overlapping longitudinal gas flow passageways, one of which has an upstream end which communicates directly with and receives gas flow from said augmentor tube means, and the other of which has a downstream end which communicates directly with and delivers gas to said discharge outlet, there being a multiplicity of unobstructed, high-velocity gas-jet orifices formed in and along the length of said conical wall to provide gas flow between said passageways along the length thereof.

17. In a suppressor for exhaust noise of a jet engine, the combination of: an augmentor tube means having an inlet end adapted to receive the exhaust gas stream from a jet engine and an injection flow of secondary ambient air around said stream, a gas conduit connected at one end to and extending axially from the opposite end of said augmentor tube means, said conduit being terminated at its opposite end by a discharge outlet, said gas conduit being enlarged in diameter immediately aft of said augmentor tube means, a generally frusto-conical, rearwardly convergent perforated wall joined at its large end to said gas conduit aft of the enlargement therein, an annular perforated wall extending longitudinally spaced inside said frusto-conical wall and joined at its aft extremity to the aft extremity of said frusto-conical wall, a closure for the forward end of said annular wall, and a sound absober body annularly spaced inside said annular wall.

18. The subject matter of claim 17, including water spray means for discharging water generally forwardly from said closure.

References Cited by the Examiner

UNITED STATES PATENTS

| | | | |
|---|---|---|---|
| 2,504,422 | 4/50 | Johnson et al. | 181—33.221 |
| 2,514,749 | 7/50 | Dobbins | 181—33.22 |
| 2,523,260 | 9/60 | Campbell | 181—50 |
| 2,529,136 | 11/50 | Carlson | 181—63 X |
| 2,613,758 | 10/52 | Cullum | 181—33.221 |
| 2,810,449 | 10/57 | Coleman | 181—33.221 |
| 2,823,756 | 2/58 | Bridge et al. | 181—33.221 |
| 2,886,121 | 5/59 | Welbourn | 181—33.221 |
| 2,936,846 | 5/60 | Tyler et al. | 181—33.22 |

FOREIGN PATENTS

| | | |
|---|---|---|
| 584,284 | 9/59 | Canada. |
| 1,199,789 | 6/59 | France. |
| 678,851 | 9/52 | Great Britain. |

LEO SMILOW, *Primary Examiner.*

C. W. ROBINSON, ARNOLD RUEGG, *Examiners.*